(12) United States Patent
Ollila

(10) Patent No.: US 11,966,045 B2
(45) Date of Patent: Apr. 23, 2024

(54) OPTICAL FOCUS ADJUSTMENT BASED ON OCCLUSION

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 208 days.

(21) Appl. No.: 17/567,579

(22) Filed: Jan. 3, 2022

(65) Prior Publication Data
US 2023/0213755 A1    Jul. 6, 2023

(51) Int. Cl.
G02B 27/00   (2006.01)
G06F 3/01    (2006.01)
G06T 7/70    (2017.01)
G06V 10/25   (2022.01)

(52) U.S. Cl.
CPC ..... G02B 27/0075 (2013.01); G02B 27/0093 (2013.01); G06F 3/013 (2013.01); G06T 7/70 (2017.01); G06V 10/25 (2022.01)

(58) Field of Classification Search
CPC . G02B 27/0075; G02B 27/0093; G06F 3/013; G06T 7/70; G06V 10/25; H04N 13/296; H04N 13/344; H04N 13/383; H04N 13/239
USPC ....................... 348/14.03, 78, 340
See application file for complete search history.

(56) References Cited

U.S. PATENT DOCUMENTS

| 2017/0161951 A1* | 6/2017 | Fix ........................ G06V 40/19 |
| 2019/0179409 A1* | 6/2019 | Jones .................. G02B 27/0172 |
| 2021/0243384 A1* | 8/2021 | Ollila ..................... G06V 20/20 |

FOREIGN PATENT DOCUMENTS

| JP | 2016191927 A | 11/2016 |
| WO | 2018005985 A1 | 1/2018 |

OTHER PUBLICATIONS

European Patent Office, Notification of Transmittal of the International Search Report and the Written Opinion of the International Searching Authority, or the Declaration, International Application No. PCT/FI2022/050812, dated Mar. 27, 2023, 19 pages.

* cited by examiner

*Primary Examiner* — Yosef K Laekemariam
(74) *Attorney, Agent, or Firm* — Ziegler IP Law Group

(57) ABSTRACT

An imaging system including: first camera and second camera; depth-mapping means; gaze-tracking means; and processor configured to: generate depth map of real-world scene; determine gaze directions of first eye and second eye; identify line of sight and conical region of interest; determine optical depths of first object and second object present in conical region; determine one of first camera and second camera having lesser occlusion in real-world scene; adjust optical focus of one of first camera and second camera to focus on one of first object and second object having greater optical depth, and adjust optical focus of another of first camera and second camera to focus on another of first object and second object; and capture first image(s) and second image(s) using adjusted optical focuses of cameras.

16 Claims, 4 Drawing Sheets

OPTICAL FOCUS ADJUSTMENT BASED ON OCCLUSION

TECHNICAL FIELD

The present disclosure relates to imaging systems incorporating optical focus adjustment based on occlusion. The present disclosure also relates to methods for optical focus adjustment based on occlusion.

BACKGROUND

In recent times, there has been an ever-increasing demand for image capturing and processing. For example, such a demand may be quite high and critical in case of evolving technologies such as immersive extended-reality (XR) technologies which are being employed in various fields such as entertainment, real estate, training, medical imaging operations, simulators, navigation, and the like. Such immersive XR technologies create immersive XR environments for presentation to a user of an XR device (such as an XR headset, a pair of XR glasses, or similar). Several advancements are being made to develop image capturing and processing technology. Existing imaging systems employ camera(s) for capturing images of a real-world environment.

However, existing imaging systems have several problems associated therewith. Firstly, the existing imaging systems are inefficient in terms of accurately and automatically focusing on multiple objects present in a real-world scene of the real-world environment, when images of such a real-world scene are captured. The existing imaging systems employ gaze-trackers to track the user's gaze when multiple objects having different optical depths are present in a user's field of view. In such a case, focusing on the multiple objects is cumbersome and focusing on the multiple objects relies on a limited accuracy of the gaze-trackers and a limited depth of field of camera(s). As a result, inaccurate and suboptimal focusing is achieved. The existing imaging systems employ focusing schemes which are not well-suited for accurately obtaining in-focus images of the multiple objects. For example, some focusing schemes may be employed for images that have already been captured by the camera(s). In this regard, such focusing schemes divide a (2D) captured image into different areas with different focusing weights, and consider an area (for focusing in the captured image) that is considerably larger than an actual gaze area of a human eye. This is due to the fact that a shape of the considered area is, for example, a rectangle, and a shape of the actual gaze area is circular. Secondly, the existing imaging systems are also inefficient in terms of compensating field curvature effect. The existing imaging systems employ actuators that are slow in their speed of operation, for changing magnitude of focal lengths of optical elements used in such imaging systems, for focusing on the multiple objects. The images captured by the existing imaging systems have poor visual quality, thereby leading to a sub-optimal (i.e., lack of realism), non-immersive viewing experience for a user viewing said images.

Therefore, in light of the foregoing discussion, there exists a need to overcome the aforementioned drawbacks associated with the existing imaging systems for capturing images.

SUMMARY

The present disclosure seeks to provide an imaging system incorporating optical focus adjustment based on occlusion. The present disclosure also seeks to provide a method for optical focus adjustment based on occlusion. An aim of the present disclosure is to provide a solution that overcomes at least partially the problems encountered in prior art.

In one aspect, an embodiment of the present disclosure provides an imaging system comprising:
- a first camera and a second camera that are to be employed to capture images of a real-world environment from a perspective of a first eye and a second eye of a user, respectively, each of the first camera and the second camera having an adjustable optical focus;
- depth-mapping means;
- gaze-tracking means; and
- a processor configured to:
  - process depth-mapping data, collected by the depth-mapping means, to generate a depth map of a given real-world scene of the real-world environment;
  - process gaze-tracking data, collected by the gaze-tracking means, to determine gaze directions of the first eye and the second eye;
  - identify, based on the gaze directions of the first eye and the second eye, a line of sight of the user and a conical region of interest in the given real-world scene whose axis is the line of sight of the user;
  - determine, based on the depth map of the given real-world scene, optical depths of a first object and a second object that are present at least partially in the conical region of interest in the given real-world scene, the first object and the second object being at different optical depths;
  - determine one of the first camera and the second camera that has lesser occlusion in the given real-world scene than another of the first camera and the second camera;
  - adjust the optical focus of the one of the first camera and the second camera to focus on one of the first object and the second object whose optical depth is greater than the optical depth of another of the first object and the second object, and adjust the optical focus of the another of the first camera and the second camera to focus on the another of the first object and the second object, based on the optical depths of the first object and the second object; and
  - control the first camera and the second camera to capture at least one first image and at least one second image using the adjusted optical focus of the first camera and the adjusted optical focus of the second camera, respectively.

In another aspect, an embodiment of the present disclosure provides a method comprising:
- processing depth-mapping data, collected by depth-mapping means, to generate a depth map of a given real-world scene of a real-world environment;
- processing gaze-tracking data, collected by gaze-tracking means, to determine gaze directions of a first eye and a second eye;
- identifying, based on the gaze directions of the first eye and the second eye, a line of sight of the user and a conical region of interest in the given real-world scene whose axis is the line of sight of the user;
- determining, based on the depth map of the given real-world scene, optical depths of a first object and a second object that are present at least partially in the conical region of interest in the given real-world scene, the first object and the second object being at different optical depths;

determining one of the first camera and the second camera that has lesser occlusion in the given real-world scene than another of the first camera and the second camera;

adjusting the optical focus of the one of the first camera and the second camera to focus on one of the first object and the second object whose optical depth is greater than the optical depth of another of the first object and the second object, and adjusting the optical focus of the another of the first camera and the second camera to focus on the another of the first object and the second object, based on the optical depths of the first object and the second object; and controlling the first camera and the second camera to capture at least one first image and at least one second image of the real-world environment using the adjusted optical focus of the first camera and the adjusted optical focus of the second camera, respectively, wherein the at least one first image and the at least one second image are captured from a perspective of the first eye and the second eye, respectively.

Embodiments of the present disclosure substantially eliminate or at least partially address the aforementioned problems in the prior art, and enable capturing of high-quality, highly immersive and realistic images, by way of using accurate and automatic optical focus adjustment based on occlusion and enable the user to clearly see multiple objects located at different optical depths simultaneously.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2A illustrates a conical region of interest, while

Figure 1:
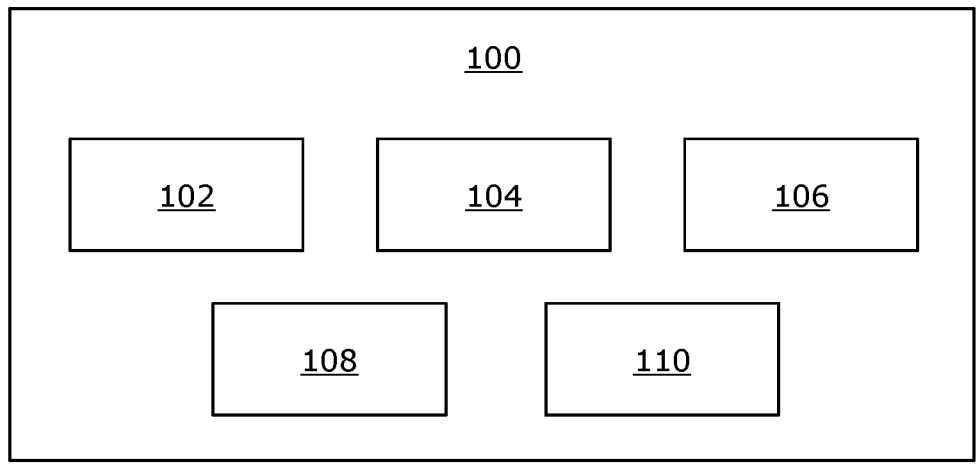
FIG. 1 illustrates a block diagram of an architecture of an imaging system incorporating optical focus adjustment based on occlusion, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system comprising:

a first camera and a second camera that are to be employed to capture images of a real-world environment from a perspective of a first eye and a second eye of a user, respectively, each of the first camera and the second camera having an adjustable optical focus;

depth-mapping means;

gaze-tracking means; and a processor configured to:

process depth-mapping data, collected by the depth-mapping means, to generate a depth map of a given real-world scene of the real-world environment;

process gaze-tracking data, collected by the gaze-tracking means, to determine gaze directions of the first eye and the second eye;

identify, based on the gaze directions of the first eye and the second eye, a line of sight of the user and a conical region of interest in the given real-world scene whose axis is the line of sight of the user;

determine, based on the depth map of the given real-world scene, optical depths of a first object and a second object that are present at least partially in the conical region of interest in the given real-world scene, the first object and the second object being at different optical depths;

determine one of the first camera and the second camera that has lesser occlusion in the given real-world scene than another of the first camera and the second camera;

adjust the optical focus of the one of the first camera and the second camera to focus on one of the first object and the second object whose optical depth is greater than the optical depth of another of the first object and the second object, and adjust the optical focus of the another of the first camera and the second camera to focus on the another of the first object and the second object, based on the optical depths of the first object and the second object; and control the first camera and the second camera to capture at least one first image and at least one second image using the adjusted optical focus of the first camera and the adjusted optical focus of the second camera, respectively.

In another aspect, an embodiment of the present disclosure provides a method comprising:

processing depth-mapping data, collected by depth-mapping means, to generate a depth map of a given real-world scene of a real-world environment;

processing gaze-tracking data, collected by gaze-tracking means, to determine gaze directions of a first eye and a second eye;

identifying, based on the gaze directions of the first eye and the second eye, a line of sight of the user and a conical region of interest in the given real-world scene whose axis is the line of sight of the user;

determining, based on the depth map of the given real-world scene, optical depths of a first object and a second object that are present at least partially in the conical region of interest in the given real-world scene, the first object and the second object being at different optical depths;

determining one of the first camera and the second camera that has lesser occlusion in the given real-world scene than another of the first camera and the second camera;

adjusting the optical focus of the one of the first camera and the second camera to focus on one of the first object and the second object whose optical depth is greater than the optical depth of another of the first object and the second object, and adjusting the optical focus of the another of the first camera and the second camera to focus on the another of the first object and the second object, based on the optical depths of the first object and the second object; and controlling the first camera and the second camera to capture at least one first image and at least one second image of the real-world environment using the adjusted optical focus of the first camera and the adjusted optical focus of the second camera, respectively, wherein the at least one first image and the at least one second image are captured from a perspective of the first eye and the second eye, respectively.

The present disclosure provides the aforementioned imaging system and the aforementioned method for capturing high-quality and realistic images, by way of using optical focus adjustment based on occlusion. Herein, according to optical depths of the first object and the second object present in a gaze-contingent conical region of interest, and occlusion of a given camera in the given real-world scene, the processor is configured to automatically and accurately adjust an optical focus of the given camera to focus on the first object or the second object. A camera having less occlusion in the given real-world scene focusses on an object that is far from user's eyes, and a camera having more occlusion in the given real-world scene focusses on an object that is near the user's eyes or at an intermediate distance from the user's eyes, when capturing the images of the real-world environment. In such a case, even when multiple objects having different optical depths are present inside the conical region of interest within the user's field of view, multi-camera focusing on the multiple objects is performed to enable the user to see clearly the multiple objects located at the different optical depths simultaneously. Beneficially, due to this, the at least one first image and the at least one second image so captured represent these objects in a realistic manner (i.e., similar to how a human eye would have viewed these objects), thereby providing an immersive viewing experience to the user. The images captured by the imaging system do not suffer from shortcomings on account of gaze-tracking inaccuracies, slow actuation, and the like. In particular, image qualities of said images are very high and emulate characteristics of a human visual system. The method is fast, effective, reliable and can be implemented with ease.

Moreover, the aforementioned imaging system overcomes the problems in conventional focusing schemes, because the conventional focusing schemes do not take into account both eyes of the user to be focused differently when the user is viewing a 3D real-world scene. Such focusing schemes also do not take into account distortions due to lenses of the camera(s) and variations of lens characteristics with distances between the camera(s) and the multiple objects.

Throughout the present disclosure, the term "camera" refers to an equipment that is operable to detect and process light signals received from the real-world environment, so as to capture the images of the real-world environment. Optionally, a given camera is implemented as a visible-light camera. The term "given camera" encompasses the first camera, or the second camera, or both the first camera and the second camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, an infrared (IR) camera. As an example, the given camera may be implemented as the stereo camera.

Notably, the given camera has an adjustable optical focus. This means that the given camera is focusable i.e., a focal plane of at least one optical element (for example, a camera lens) of the given camera is adjustable. Such an adjustment facilitates in capturing sharp images of the gaze-contingent objects present in the real-world environment.

Optionally, the given camera is arranged on a display apparatus worn by the user on his/her head, wherein the given camera is aligned to capture a given image of the real-world environment from a perspective of a given eye of the user. Optionally, in this regard, the first camera and the second camera are arranged to face the real-world environment in a manner that a distance between them is equal to an interpupillary distance between the first eye and the second eye of the user. The term "display apparatus" refers to a specialized equipment that is capable of displaying images. These images are to be presented to the user of the display apparatus. Optionally, the display apparatus is implemented as a head-mounted display (HMD) device. The term "head-mounted display" refers to specialized equipment that is configured to present an XR environment to the user when said HMD device, in operation, is worn by the user on his/her head. The HMD device is implemented, for example, as an XR headset, a pair of XR glasses, and the like, that is operable to display a visual scene of the XR environment to the user. In this regard, the at least one first image and the at least one second image are utilized for generating the visual scene of the XR environment. The term "extended-reality" encompasses virtual reality (VR), augmented reality (AR), mixed reality (MR), and the like.

In some implementations, the imaging system is integrated with the display apparatus. In such implementations, all components of the imaging system are physically coupled to the display apparatus (for example, attached via mechanical and/or electrical connections to components of the display apparatus). Optionally, in such implementations, the processor of the imaging system serves as a processor of the display apparatus. Alternatively, optionally, in such implementations, the processor of the imaging system is communicably coupled to a processor of the display apparatus.

In other implementations, at least one component (such as the first camera and the second camera) of the imaging system is implemented on a remote device that is separate from the display apparatus. In such implementations, the imaging system is implemented in a distributed manner, wherein the processor of the imaging system and a processor of the display apparatus are communicably coupled, wirelessly and/or in a wired manner. Examples of the remote device include, but are not limited to, a computer, a drone, a vehicle, and a robot.

Notably, the processor controls overall operation of the imaging system. The processor is communicably coupled to the first and the second cameras, the depth-mapping means, and the gaze-tracking means.

According to one embodiment, the depth-mapping means comprises a specialized equipment that is employed to detect depth information within the real-world environment i.e., optical depths of (real-world) objects or their portions present in the real-world environment. Optionally, the depth-mapping means is implemented as the first camera and the second camera. In this regard, the given camera is implemented as the visible-light camera or as the combination of the visible-light camera and the depth camera. Alternatively, optionally, the depth-mapping means is implemented as at least one depth camera.

Throughout the present disclosure, the term "depth map" refers to a data structure comprising information pertaining to the optical depths of the objects or their portions present in the given real-world scene of the real-world environment. It will be appreciated that the given real-world scene is a 3D real-world scene that is to be presented to the user (after optional processing of the images of the real-world environment). The depth map provides information pertaining to distances (namely, the optical depths) of surfaces of the objects or their portions, from a given viewpoint and a given viewing direction of the user. Optionally, the depth map is an image comprising a plurality of pixels, wherein a pixel value of each pixel indicates optical depth of its corresponding real point/region within the given real-world scene.

Optionally, the processor is configured to employ at least one data processing algorithm to process the depth-mapping data for generating the depth map of the given real-world scene of the real-world environment. The depth-mapping data may be in form of depth images, phase images, visible-light images, or similar. Correspondingly, requisite data processing algorithm(s) is/are employed to process the depth-mapping data. The depth-mapping data may be collected repeatedly (in real time or near-real time) throughout a given session of using the imaging system (and the display apparatus), as the optical depths of the objects or their portions may change whilst the imaging system (and the display apparatus) is in use.

A given depth image represents the optical depths of the objects or their portions present in the given real-world scene of the real-world environment with respect to a given view point. The given depth image may also represent visual content in the given real-world scene, in addition to the optical depths of the objects or their portions. Optionally, the given depth image is a two-dimensional (2D) depth image or a 3D depth image.

Optionally, a given phase image is captured using the at least one depth camera by: illuminating the real-world environment with a modulated light signal, and then detecting and processing a reflection of the modulated light signal that is received from the real-world environment, for determining a specific phase shift between said illumination and said reflection. The given phase image is representative of such a phase shift. Information indicative of this phase shift constitutes the given phase image and is obtained by sampling a cross-correlation of the modulated light signal with the reflection of the modulated light signal. In an example implementation, a set of four different phase images may be processed by the processor for generating a given depth map.

Optionally, when the depth-mapping means is implemented as the first camera and the second camera, wherein the first camera and the second camera are implemented as a first visible-light camera and a second visible-light camera, respectively, the processor is configured to:
  control the first visible-light camera and the second visible-light camera to capture a first visible-light image and a second visible-light image, respectively; and
  process the first visible-light image and the second visible-light image to generate the depth map of the given real-world scene of the real-world environment.

Optionally, in this regard, when processing the first and the second visible-light images, pixels of the first and the second visible-light images that represent a same 3D point or a same 3D region in the real-world environment are matched. Then, binocular disparities between the matched pixels of said visible-light images are determined. These binocular disparities are processed (for example, using a triangulation technique) to determine the optical depths of the objects or their portions with respect to the first and the second visible-light cameras. Such optical depths of the objects or their portions within the given real-world scene are represented in the depth map. It will be appreciated that the depth map could also be generated using at least one of: depth from stereo, depth from focus, depth from reflectance, depth from shading, when the given camera has at least one of: a coded aperture, a sensor chip having phase detection autofocus (PDAF) pixels, a sensor chip in which some of its pixels are IR pixels. Such IR pixels can detect, for example, a structured light at an active-IR illumination.

According to an alternative or additional embodiment, the depth-mapping means is implemented as the processor or another processor of the imaging system, wherein the processor or the another processor is configured to utilise a three-dimensional (3D) environment model of the real-world environment to generate the depth map of the given real-world scene of the real-world environment from a perspective of a pose of the user's head. In such a case, the depth-mapping means may have been previously employed for generation of the 3D environment model of the real-world environment. The "three-dimensional environment model" is a data structure that comprises comprehensive information pertaining to a 3D space of the real-world environment. The 3D environment model may be in a form of a 3D polygonal mesh, a 3D point cloud, a 3D surface cloud, a voxel-based model, a 3D grid, or similar. The 3D environment model is optionally generated by the processor. Optionally, in this regard, the display apparatus comprises a pose-tracking means that is employed to detect and/or follow the pose of the user's head in the 3D space of the real-world environment. The pose-tracking means may employ an outside-in tracking technique, an inside-out tracking technique, or a combination of both the aforesaid techniques, for collecting pose-tracking data. Such techniques are well-known in the art. The pose-tracking data may be in form of images, IMU/TIMU values, motion sensor data values, magnetic field strength values, or similar.

Throughout the present disclosure, the term "gaze-tracking means" refers to specialized equipment for detecting and/or following gaze of a given eye of the user. The term "gaze direction" refers to a direction in which the given eye of the user is gazing. The gaze direction may be represented by a gaze vector. It will be appreciated that when user's gaze is directed (namely, focused) towards a point or a region within the given real-world scene, a gaze direction of the first eye and a gaze direction of the second eye are different from each other, and both the gaze directions will converge at said point or said region. The first eye is one of a left eye or a right eye of the user, while the second eye is another of the left eye or the right eye of the user. In an example, when an object present within the given real-world scene lies straight in front of the user, the gaze direction of the left eye may be rightwards and the gaze direction of the right eye may be leftwards, when the user focuses on the object.

The gaze-tracking means could be implemented as contact lenses with sensors, cameras monitoring a position, a size and/or a shape of a pupil of the given eye of the user, and the like. Such gaze-tracking means are well-known in the art. The gaze-tracking data may comprise images of the given eye of the user, sensor values, and the like. Optionally, when processing the gaze-tracking data to determine the gaze directions of the first eye and the second eye, the processor is configured to employ at least one of: an image processing algorithm, a feature extraction algorithm, a data processing algorithm. It will be appreciated that the gaze-tracking data is collected repeatedly by the gaze-tracking means throughout the given session of using the imaging system (and the display apparatus), as gaze of the user's eye keeps changing whilst he/she uses the imaging system (and the display apparatus). An up-to-date gaze-tracking data (indicative of a gaze direction of the given eye of the user) allows for generating up-to-date gaze-contingent image(s).

Throughout the present disclosure, the term "line of sight" refers to an imaginary line extending between a midpoint of a line segment connecting the first eye and the second eye of the user and a point or a region in the real-world environment at which the gaze of the first eye and the second eye are focused (i.e., intersect or converge). The midpoint of the line segment connecting the first eye and the second eye may serve as an apex (namely, pointed tip) of a cone formed by the conical region of interest. In this way, the line of sight and the conical region of interest are identified based on the gaze directions. Furthermore, the term "conical region of interest" refers to a 3D viewing cone defined by the gaze directions of the first eye and the second eye. It will be appreciated that there can be a first 3D viewing cone and a second 3D viewing cone with respect to the first eye and the second eye, respectively. A given 3D viewing cone may depend on gaze tracker accuracy as well as a size of a natural human vision cone for an optical depth at which the user is gazing. The conical region of interest is a region of focus of the user's gaze within the given real-world scene. Notably, objects lying within the conical region of interest are gaze-contingent objects. Such objects are focused onto foveas of the user's eyes, and are resolved to a much greater detail as compared to remaining object(s) present in the given real-world scene (that is, objects lying outside the conical region of interest).

Optionally, a shape of the conical region of interest depends on the gaze directions of the first eye and the second eye. In an example, when the gaze directions of the first eye and the second eye are focused at a centre of the given real-world scene (i.e., at a centre of a collective field of view of the first eye and the second eye), the conical region of interest may be in a shape of a right circular cone. When the gaze directions of the first eye and the second eye are focused on a point towards a given side of the given real-world scene, the conical region of interest may be in a shape of an oblique cone. The given side may be a left side, a right side, a top side, a bottom side, or a corner side, of the given real-world scene.

Optionally, an apex angle of a cone formed by the conical region of interest lies in a range of 5 degrees to 25 degrees. The term "apex angle" refers to an angle that extends between boundaries of the cone that define the apex. As an example, the apex angle of the cone formed by the conical region of interest may be from 5, 7.5, 10, 15 or 17.5 degrees up to 7.5, 10, 15, 20 or 25 degrees. In an example, the apex angle of the cone formed by the conical region of interest may be 20 degrees.

Notably, since the depth map is generated by the processor, the information pertaining to the optical depths of the objects or their portions present in the given real-world scene is accurately known to the processor. Therefore, the optical depths of the first object and the second object that are present at least partially in the conical region of interest are easily and accurately determined by the processor using the depth map. It will be appreciated that for determining an optical depth of a given object that is present at least partially in the conical region of interest, the given object need not be identified (namely, recognized) by the processor. The term "given object" encompasses the first object, or the second object, or both the first object and the second object.

When the first object and the second object are at different optical depths, the first object (or a portion of the first object) and the second object (or a portion of the second object) are present at different (optical) distances in the given real-world scene from the user's eyes. In an example, the first object may be at a greater optical depth as compared to the second object. In such a case, the first object is farther from the user's eyes as compared to the second object. In another example, the second object may be at a greater optical depth as compared to the first object. In such a case, the first object is nearer to the user's eyes as compared to the second object.

Optionally, when an optical depth of a given object lies in a range of 20 centimetres to 100 centimetres, the given object is considered to be near the user's eyes. As an example, the optical depth of the given object may be from 20, 25, 50 or 65 centimetres up to 40, 60, 90 or 100 centimetres. Moreover, optionally, when the optical depth of the given object is greater than 100 centimetres, the given object is considered to be far from the user's eyes. In such a case, the optical depth of the given object lies in a range between 100 centimetres and infinity. As an example, the optical depth of the given object may be 100 centimetres, 110 centimetres, 120 centimetres, 150 centimetres, and so on. Furthermore, optionally, when the optical depth of the given object lies in a range of 80 centimetres to 120 centimetres, the given object is considered to be at an intermediate distance from the user's eyes. In such a case, the given object is present neither too near to nor too far from the user's eyes. As an example, the optical depth of the given object may be from 80, 85, 95 or 110 centimetres up to 90, 100 or 120 centimetres.

In an embodiment, when determining the optical depths of the first object and the second object, the processor is configured to:
  determine optical depths of a plurality of objects that are present at least partially in the conical region of interest in the given real-world scene;

determine relative poses of the plurality of objects with respect to the user, based on the optical depths of the plurality of objects;

determine two regions within the given real-world scene on which the user's gaze has been fixated the most during at least a predefined time period;

determine relative poses of the two regions with respect to the user; and select the optical depths of the first object and the second object from amongst the optical depths of the plurality of objects, when relative poses of the first object and the second object with respect to the user match with the relative poses of respective ones of the two regions.

Optionally, when determining the optical depths of the plurality of objects, the processor is configured to utilize at least one of:

the depth map of the given real-world scene;

analysis of at least one of: contrast values, colour values, alpha values, texture values, image segments of recently-captured images. The recently-captured images may be captured within the predefined time period. The processor employs at least one image processing algorithm for performing said analysis.

Throughout the present disclosure, the term "pose" encompasses both position and orientation. The relative poses of the plurality of objects are indicative of offsets between a pose of the user's head and the poses of the plurality of objects. Since the optical depths of the plurality of objects indicate distances of the plurality of objects from the user, the processor can accurately and readily determine how the plurality of objects are arranged (namely, positioned) with respect to the user by utilizing the optical depths of the plurality of objects and a current pose of the user's head. Furthermore, when a given object from amongst the plurality of objects has a specific orientation (i.e., arranged at an angle) with respect to the user's head, different edges and/or surfaces of the given object may have different optical depths. For example, the given object may have an orientation such that a first edge of the given object is nearer to the user's eyes as compared to a second edge of the given object. In such a case, the first edge may have smaller optical depth as compared to the second edge. Such a difference in the optical depths can be ascertained, by the processor, by utilizing the optical depths of the plurality of objects. Therefore, the processor can accurately and readily determine how the given object is oriented with respect to the user's head (namely, the user's eyes).

Optionally, when determining the two regions within the given real-world scene, the processor is configured to generate a 3D heat map of the user's gaze and use the 3D heat map to identify the two regions. The 3D heat map of the user's gaze indicates a frequency with which the user gazed at different points or regions within the given real-world scene, during the predefined time period. In particular, the 3D heat map of the user's gaze indicates points or regions at which the user gazed most frequently during the predefined time period. Such regions may be depicted using a colour-coding scheme, wherein different regions at which the user gazed with different frequencies are represented using different colours. It will be appreciated that the 3D heat map optionally includes position information of various points or regions of the 3D space of the real-world environment, in addition to an indication of the points or regions at which the user gazed during the predefined time period. In this regard, the 3D heat map could be in a form of a data structure (such as a 3D point cloud) that comprises the aforesaid information.

In an example, the 3D heat map may indicate 4 regions, R1, R2, R3, and R4, wherein the user's gaze has been directed most frequently at the region R1, second most frequently at the region R2, third most frequently at the region R3, and fourth most frequently at the region R4, during the predefined time period. In such a case, the regions R1 and R2 are determined as the two regions at which the user's gaze has been fixated the most during the predefined time period.

It will be appreciated that "fixation" of the user's gaze means the user's gaze is maintained on any object present in the given real-world scene for a given time period. Typically, a human eye is capable of resolving approximately 20 individual images per second. Thus, gaze fixation can be considered to have occurred, if the user's gaze has been fixated on any object for at least 1/20th of a second (namely, 50 milliseconds).

Optionally, the predefined time period is greater than or equal to 500 milliseconds. Alternatively, optionally, the predefined time period lies in a range of 100 milliseconds to 3000 milliseconds (i.e., 3 seconds). As an example, the predefined time period may be from 100, 200, 300, 500, 750 or 1000 milliseconds up to or 500, 1000, 2000, 3000 or 5000 milliseconds.

By selecting the optical depths of the first object and the second object based on matching of the relative poses of the first object and the second object with the relative poses of the respective ones of the aforesaid two regions, it is ensured that only those objects from amongst the plurality of objects that are most-frequently gaze-contingent are selected as the first object and the second object. Consequently, focusing of the first camera and the second camera on these objects (i.e., the first object and the second object), instead of other objects, facilitates generation of the at least one first image and the at least one second image that represent these objects at a high-resolution, thereby providing an immersive and realistic viewing experience to the user. Moreover, image qualities of the at least one first image and the at least one second image emulate characteristics of a human visual system.

In another embodiment, when determining the optical depths of the first object and the second object, the processor is configured to:

determine optical depths of a plurality of objects that are present at least partially in the conical region of interest in the given real-world scene; and select the optical depths of the first object and the second object from amongst the optical depths of the plurality of objects randomly.

In this regard, the first object and the second object are randomly selected (i.e., without considering the user's gaze) by the processor from amongst the plurality of objects. Such a random selection means that different objects are selected as the first object and the second object for capturing subsequent images. As a result, the first camera and the second camera are focused on these different objects for capturing the subsequent images that are to be shown to the user. The technical benefit of the random selection is that the user would apparently see all selected objects (namely, objects that have been randomly selected in a sequence of images) clearly and in a realistic manner, thereby providing an immersive viewing experience to the user. Moreover, an image quality of the sequence of images emulates characteristics of a human visual system.

Notably, a given camera (i.e., the one of the first camera and the second camera) that has lesser occlusion in the given real-world scene as compared to a remaining camera (i.e., the another of the first camera and the second camera), is preferred to focus on an object that is far from the user's eyes, while the remaining camera is preferred to focus on an object that is near the user's eyes or at an intermediate distance from the user's eyes. When a field of view of the given camera is less occluded (namely, less blocked) than a field of view of the remaining camera, the given camera has lesser occlusion than the remaining camera. It will be appreciated that when the given camera has lesser occlusion in the given real-world scene, the field of view of the given camera includes considerably more region(s) and/or object(s) of the given real-world scene as compared to the field of view of the remaining camera. Therefore, a given object (i.e., the one of the first object and the second object) having a high optical depth, is more likely to be accurately and well-focused by the given camera (as the given camera has considerably better and preferable view of the given real-world scene for said focusing, as compared to the remaining camera). Moreover, a remaining object (i.e., the another of the first object and the second object) having a low optical depth is well-focused by the remaining camera. Beneficially, the first object and the second object would appear sharp in subsequently captured images by the first camera and the second camera. In this manner, the user experiences seamless gaze-contingency and considerable realism upon viewing multiple objects at different optical depths from the user's eyes simultaneously.

Optionally, the one of the first camera and the second camera that has lesser occlusion in the given real-world scene is determined, based on at least one of: the depth map of the given real-world scene, monocular clues from an image representing the given real-world scene, binocular disparities in a stereo image pair representing the given real-world scene, an optical flow in a sequence of images representing the given real-world scene. In this regard, since the depth map is generated by the processor, the optical depths of the objects or their portions present in the given real-world scene are accurately known to the processor, and thus can be beneficially utilized for determining the occlusion (of a given camera) in the given real-world scene. Optionally, the processor is configured to analyse the monocular clues to determine the optical depths in the given real-world scene. In this regard, the processor determines the occlusion in the given real-world scene by utilizing the optical depths and the pose of the user's head. The aforesaid manner of using the monocular clues for determining the optical depths is well-known in the art. One such way is described, for example, in "*SymmNet: A Symmetric Convolutional Neural Network for Occlusion Detection*" by Ang Li and Zejian Yuan, published in British Machine Vision Conference, 2018, which has been incorporated herein by reference. Furthermore, the binocular disparities in the stereo image pair are optionally determined by the processor, for example, using a left-to-right-consistency (LRC) check. Such binocular disparities are processed to determine the optical depths (with respect to the first camera and the second camera) which are represented in the depth map that is subsequently used for determining the occlusion in the given real-world scene. Such a manner of using the binocular disparities for determining the optical depths is well-known in the art. Optionally, the processor is configured to analyse the optical flow in the sequence of images to determine disparity map estimates. Such disparity map estimates are then processed to generate the depth map. Such a manner of using the optical flow for generating the depth map is also well-known in the art.

Optionally, when determining the one of the first camera and the second camera that has lesser occlusion, the processor is configured to:
  determine an angular width of at least one object that is present in the conical region of interest in the given real-world scene at an optical depth that lies in a range of 10 centimetres to 150 centimetres; and
  divide the given real-world scene into a first side and a second side, wherein the first side and the second side of the given real-world scene face the first camera and the second camera, respectively,
  wherein the one of the first camera and the second camera is determined to have lesser occlusion than the another of the first camera and the second camera, when more than 50 percent of the angular width of the at least one object is on a corresponding side of the another of the first camera and the second camera.

Optionally, the angular width of the at least one object that is present in the conical region of interest is determined based on at least one of: the depth map of the given real-world scene, the monocular clues from the image representing the given real-world scene, the binocular disparities in the stereo image pair representing the given real-world scene, the optical flow in the sequence of images representing the given real-world scene.

As an example implementation, the angular width of the at least one object may be determined based on the depth map of the given real-world scene. In this regard, since the depth map is generated by the processor, the optical depth and the angular width of the at least one object (namely, an angular extent of a size of the at least one object) are accurately known to the processor. It will be appreciated that greater the angular width of the at least one object, greater is the occlusion of a field of view of the first camera and/or a field of view of the second camera by the at least one object. It will also be appreciated that the at least one object may or may not be any of: the first object, the second object. When the optical depth of the at least one object lies in the range of 10 centimetres to 150 centimetres, the at least one object could be near the user's eyes or could be at an intermediate distance from the user's eyes. Thus, the occlusion of the field of view of the first camera and/or the field of view of the second camera could be due to a near object as well as an intermediate object. As an example, the at least one object may comprise a nearest object having a low angular width. In such a case, an extent of occluding the field of view of the first camera and/or the field of view of the second camera by the nearest object may be low. When the at least one object comprises an intermediate object having a high angular width, an extent of occluding the field of view of the first camera and/or the field of view of the second camera by the intermediate object may be high.

Optionally, when dividing the given real-world scene into the first side and the second side, the processor employs at least one image processing algorithm. It will be appreciated that the field of view of the first camera includes region(s) and/or object(s) of the given real-world scene that are present on the first side, whereas the field of view of the second camera includes region(s) and/or object(s) of the given real-world scene that are present on the second side. Optionally, the first side is one of a left side and a right side of the given real-world scene, while the second side is another of the left side and the right side of the given real-world scene.

In an example, when more than 50 percent of the angular width of the at least one object is on the first side, it is determined that the first camera has higher occlusion as compared to the second camera. In such a case, when the optical depth of the first object is greater than the optical depth of the second object, the processor adjusts the optical focus of the second camera to focus on the first object (as the second camera has a preferable view of the given real-world scene for focusing on a far object), and adjusts the optical focus of the first camera to focus on the second object.

In another example, when more than 50 percent of the angular width of the at least one object is on the second side, it is determined that the second camera has higher occlusion as compared to the first camera. In such a case, when the optical depth of the first object is greater than the optical depth of the second object, the processor adjusts the optical focus of the first camera to focus on the first object (as the first camera has a preferable view of the given real-world scene for focusing on a far object), and adjusts the optical focus of the second camera to focus on the second object.

Optionally, a focus range of the given camera is divided into a plurality of steps. In such a case, the optical focus of the given camera is adjusted in a step-wise manner. Optionally, the plurality of steps lie in a range of 20 to 30. As an example, the plurality of steps may be from 15, 20 or 25 up to 25, 30 or 40. In an example, the plurality of steps may be 24. The focus range is a range of optical depths on which the given camera focuses within the real-world environment. It will be appreciated that different cameras have different focus ranges (in the real-world environment). Optionally, the plurality of steps divide the focus range in a plurality of intervals, based on the depth of field at different optical depths. When a given step is employed for focusing the given camera, the optical focus of the given camera is adjusted to lie at a given optical depth. As a result, the given camera well-focuses objects lying at the given optical depth, as well as objects lying within a depth of field about a focal length corresponding to the given optical depth.

In an example, a focus range of the given camera may be 300 centimetres (or 3 metres) for an optical depth between 50 centimetres (or 0.5 metres) and 350 centimetres (or 3.5 metres). Herein, the focus range of 300 centimetres may be divided into 30 steps, such that each step from amongst the 30 steps corresponds to an optical depth of 10 centimetres (or 0.1 metre). Thus, for a first step, the optical focus of the given camera may be adjusted to lie at an optical depth of 0.6 metres; for a second step, the optical focus of the given camera may be adjusted to lie at an optical depth of 0.7 metres; and so on.

Notably, the at least one first image is captured with respect to a perspective of the first eye of the user, while the at least one second image is captured with respect to a perspective of the second eye of the user. The captured pairs of the at least one first image and the at least one second image constitute at least one stereo image pair for the user's eyes. The at least one stereo image pair represents the given real-world scene of the real-world environment in a 3D realistic manner.

Upon capturing, the processor is optionally configured to employ at least one image processing algorithm to process the at least one first image and the at least one second image, prior to displaying the at least one first image and the at least one second image. Optionally, the at least one image processing algorithm is at least one of: an image cropping algorithm, an image flipping algorithm, an image rotating algorithm, an image resizing algorithm, an image orientation algorithm, an image colour-change algorithm, an image merging algorithm, an image slicing algorithm, an image layering algorithm, an image blending algorithm, an image special-effects algorithm, a virtual object generation algorithm.

Optionally, the at least one first image and the at least one second image are processed (by the processor), upon capturing, to generate at least one first XR image and at least one second XR image by digitally superimposing at least one virtual object upon the at least one first image and the at least one second image, respectively. The at least one first XR image is a view of an XR scene from the perspective of the first eye of the user, whereas the at least one second XR image is a view of an XR scene from the perspective of the second eye of the user. The at least one first XR image and the at least one second XR image constitute a stereo XR image pair for the user's eyes, which represents the XR scene of the XR environment in a 3D realistic manner. Herein, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information.

Furthermore, optionally, the first camera and the second camera comprise a first focusing lens and a second focusing lens, respectively, and wherein the processor is configured to:

determine a first portion of the first focusing lens and a second portion of the second focusing lens through which the user's gaze passes, based on the gaze directions of the first eye and the second eye; and when adjusting the optical focus of the first camera and the optical focus of the second camera, adjust a focal plane of the first focusing lens and a focal plane of the second focusing lens to compensate a field curvature of the first focusing lens and a field curvature of the second focusing lens, based on the first portion of the first focusing lens and the second portion of the second focusing lens, respectively.

The term "focusing lens" refers to an optical component that is capable of focusing a given beam of light incident thereupon. The term "given portion" encompasses the first portion, or the second portion, or both the first portion and the second portion. The term "given focusing lens" encompasses the first focusing lens, or the second focusing lens, or both the first focusing lens and the second focusing lens. In an example implementation, the given portion has a circular shape.

Typically, field curvature is a characteristic property of any lens. A focal length of the given focusing lens varies from a centre of the given focusing lens towards an edge of an image circle of the given focusing lens due to the field curvature effect. This undesirably causes a low Modulation Transfer Function (MTF) resolution in images that are captured by a camera utilizing the given focusing lens. When the given focusing lens has a high field curvature, it means that the given focusing lens will be difficult to design so that it would be well-focused on each image plane through a whole focus range, for example, from 10 centimetres to infinity, and through a whole wide field of view. The field curvature can be considered as a function of the focal length of the given focusing lens, a distortion due to the given focusing lens, a pixel size and a number of pixels that define how rapidly the given focusing lens focusses an object plane to an image plane of the sensor chip of the given camera. When the distortion due to the given focusing lens is high, the focal length of the given focusing lens needs to be varied due to the field curvature effect as the given focusing lens would not be able to accurately focus the object plane on a (flat or curved) image plane of the sensor chip of the given camera. As an example, the focal length may vary between 20 percent to 80 percent of an existing focal length. Such a variation of the focal length would also affect a depth of field of the given camera, and thus a depth of focus varies according to a focus position and a field of view of the given camera. For example, depending on the field of view of the given camera, the MTF resolution in the images may change (i.e., increase or decrease).

XR devices usually have high-resolution, small pixel size, and high frame-rate requirements. In such a case, a high distortion may have a shape of the given focusing lens that would be suitable for at least one of:
- a certain pixel per degree resolution (for human visual system),
- a high field of view,
- a high central focal length (i.e., a focal length corresponding to the centre of the given focusing lens) to maximize resolution of central pixels per degree,
- a low focal length at edge (i.e., a focal length corresponding to the edge of the image circle of the given focusing lens).

Conventional imaging systems have high distortion with a low central focal length (for example, when the existing imaging systems employ fisheye lenses) or have a constant (namely, same) focal length throughout. When the sensor chip has a flat image plane, at least two lenses may be required for focusing. Such a focusing is difficult when focal lengths of the at least two lenses are required to be changed (i.e., increased or decreased) in a rapid manner. Moreover, a rate of changing the focal lengths varies per unit length of a surface of the sensor chip. Such a rate is high due to distortion and, for a wider field of view and a number of pixels to achieve that wider field of view is limited.

Optionally, in this regard, a gaze direction of a given eye is utilised to find the given portion of the given focusing lens from where the user's gaze passes. Optionally, the processor is configured to map a gaze vector to the given focusing lens for determining the given portion of the given focusing lens from where the user's gaze passes. It will be appreciated that the given portion of the given focusing lens is required to focus light emanating from a given optical depth in the given real-world scene at a sensor chip of a corresponding camera, so that a gaze-contingent object lying at said optical depth is well-focused in a subsequently captured image.

Optionally, in this regard, the focal plane of the given focusing lens is adjusted according to a function of the gaze direction. Due to field curvature, a focal length of a portion of the focal plane mapping to the gaze direction is different from a focal length of another portion of the focal plane that does not map to the gaze direction. Thus, the focal plane of the given focusing lens is adjusted according to the focal length of the portion of the focal plane mapping to the gaze direction, to focus the light emanating from the given optical depth at the sensor chip of the given camera. In an example, accurate and realistic appearance of high contrast/sharp edges of objects (in the images) may indicate that a focal plane of the given camera has been adjusted correctly at a requisite optical depth.

In this manner, the focal plane of the given focusing lens is adjusted accurately and granularly to provide effective field curvature compensation. This minimizes (namely, mitigates) distortion in images captured by the given camera. Herein, the distortion in the images may refer to the MTF or some other lens or camera system characteristics that are responsible for mitigating, for example, chroma or other aberrations in the images, and for requisitely improving depth of field, camera focus characteristics, a sagittal resolution, a tangential resolution, and the like. The focal length of the given focusing lens is adjusted in a manner that even when the given focusing lens is shifted, the adjusted focal plane of the given focusing lens is such that a captured image does not have any out-of-focus visual content. A measurement of optical performance of a portion (namely, the given portion or a remaining portion) of the given focusing lens may be made using a through focus curve (also known as an MTF curve or a through focus MTF curve) of the portion of the given focusing lens. The given focusing lens described herein has an acceptable MTF resolution at all its portions, thereby providing a high image quality of the captured image.

Optionally, the processor is configured to adjust the optical focus of the first camera and the optical focus of the second camera, further based on a depth of field of the first camera and a depth of field of the second camera at the optical depths of respective ones of the first object and the second object being focused. The "depth of field" of a given camera refers to a distance between a nearest object (having a nearest optical depth) and a farthest object (having a farthest optical depth) which appear acceptably sharp in an image captured by the given camera when the given camera is focused at a given optical depth. The depth of field can also be identified as a zone of acceptable sharpness in front of and behind a focal plane of the given focusing lens of the given camera. A depth of field of the given camera depends on a focal length of the given focusing lens of the given camera, a focusing distance (i.e., a distance between the given camera and the given object out of the first object and the second object) within the real-world environment, an acceptable size of circle of confusion, and an aperture of the given camera. In an example, the acceptable size of the circle of confusion may be equal to one pixel, two pixels, or similar. The depth of field of the given camera may also depend on an f-number of the given focusing lens, a pixel size of a pixel of the sensor chip, characteristics of the given focusing lens, and the like. The focal length of the given focusing lens may be a function of distortion i.e., the focal length of the given focusing lens varies along an image field.

Optionally, when the depth of field of the given camera is low (i.e., narrow), the optical focus of the given camera is adjusted using more focusing steps to achieve a requisite adjustment of the focal plane of the given focusing lens, in order to correctly focus the given camera on a required optical depth. In such a case, said adjustment is stringent. Optionally, when the depth of field of the given camera is high (i.e., wide), the optical focus of the given camera is adjusted using lesser focusing steps to achieve a requisite adjustment of the focal plane of the given focusing lens, in order to correctly focus the given camera on a required optical depth. In such a case, said adjustment is simple.

The present disclosure also relates to the method as described above. Various embodiments and variants disclosed above, with respect to the aforementioned first aspect, apply mutatis mutandis to the method.

Optionally, the step of determining the one of the first camera and the second camera that has lesser occlusion is based on at least one of: the depth map of the given real-world scene, monocular clues from an image representing the given real-world scene, binocular disparities in a stereo image pair representing the given real-world scene, an optical flow in a sequence of images representing the given real-world scene.

Optionally, in the method, the step of determining the one of the first camera and the second camera that has lesser occlusion comprises:
- determining an angular width of at least one object that is present in the conical region of interest in the given real-world scene at an optical depth that lies in a range of 10 centimetres to 150 centimetres;
- dividing the given real-world scene into a first side and a second side, wherein the first side and the second side of the given real-world scene face the first camera and the second camera, respectively; and
- determining the one of the first camera and the second camera to have lesser occlusion than the another of the first camera and the second camera, when more than 50 percent of the angular width of the at least one object is on a corresponding side of the another of the first camera and the second camera.

Optionally, in the method, an apex angle of a cone formed by the conical region of interest lies in a range of 5 degrees to 25 degrees.

Optionally, in the method, the step of determining the optical depths of the first object and the second object comprises:
- determining optical depths of a plurality of objects that are present at least partially in the conical region of interest in the given real-world scene;
- determining relative poses of the plurality of objects with respect to the user, based on the optical depths of the plurality of objects;
- determining two regions within the given real-world scene on which the user's gaze has been fixated the most during at least a predefined time period;
- determining relative poses of the two regions with respect to the user; and
- selecting the optical depths of the first object and the second object from amongst the optical depths of the plurality of objects, when relative poses of the first object and the second object with respect to the user match with the relative poses of respective ones of the two regions.

Alternatively, optionally, in the method, the step of determining the optical depths of the first object and the second object comprises:
- determining optical depths of a plurality of objects that are present at least partially in the conical region of interest in the given real-world scene; and
- selecting the optical depths of the first object and the second object from amongst the optical depths of the plurality of objects randomly.

Optionally, the first camera and the second camera comprise a first focusing lens and a second focusing lens, respectively, and wherein the method further comprises determining a first portion of the first focusing lens and a second portion of the second focusing lens through which the user's gaze passes, based on the gaze directions of the first eye and the second eye,
- wherein the step of adjusting the optical focus of the first camera and the optical focus of the second camera comprises adjusting a focal plane of the first focusing lens and a focal plane of the second focusing lens to compensate a field curvature of the first focusing lens and a field curvature of the second focusing lens, based on the first portion of the first focusing lens and the second portion of the second focusing lens, respectively.

Optionally, the method further comprises adjusting the optical focus of the first camera and the optical focus of the second camera, further based on a depth of field of the first camera and the depth of field of the second camera at the optical depths of respective ones of the first object and the second object being focused.

DETAILED DESCRIPTION OF THE DRAWINGS

Referring to FIG. 1, illustrated is a block diagram of an architecture of an imaging system 100 incorporating optical focus adjustment based on occlusion, in accordance with an embodiment of the present disclosure. The imaging system 100 comprises a first camera 102, a second camera 104, depth-mapping means 106, gaze-tracking means 108, and a processor 110. The processor 110 is communicably coupled to the first camera 102, the second camera 104, the depth-mapping means 106, and the gaze-tracking means 108.

It may be understood by a person skilled in the art that the FIG. 1 includes a simplified architecture of the imaging system 100 for sake of clarity, which should not unduly limit the scope of the claims herein. The person skilled in the art will recognize many variations, alternatives, and modifications of embodiments of the present disclosure.

Figure 2A:
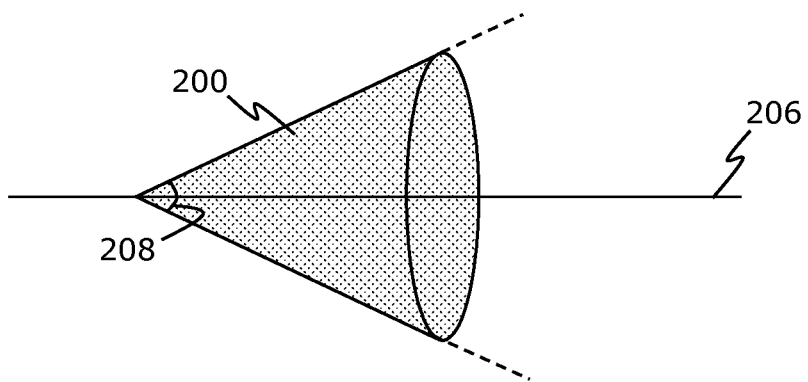
Figure 2B:
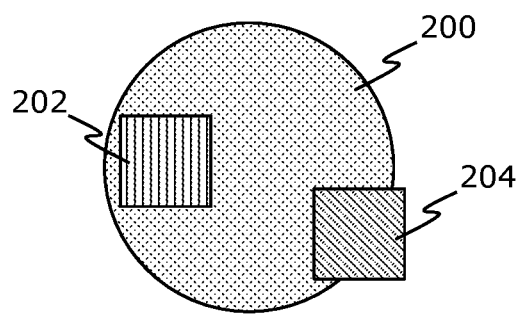
FIG. 2B illustrates a first object and a second object present at least partially in the conical region of interest, in accordance with an embodiment of the present disclosure.

Referring to FIGS. 2A and 2B, FIG. 2A illustrates a conical region of interest 200 (depicted using a dotted pattern), while FIG. 2B illustrates a first object 202 (depicted using vertical stripes pattern) and a second object 204 (depicted using diagonal stripes pattern) present at least partially in the conical region of interest 200, in accordance with an embodiment of the present disclosure. The conical region of interest 200 of FIG. 2A lies in a given real-world scene of a real-world environment (not shown). An axis of the conical region of interest 200 is defined by a line of sight 206 of a user. The conical region of interest 200 has an apex angle 208.

In FIG. 2B, the first object 202 is fully present in the conical region of interest 200, while the second object 204 is partially present in the conical region of interest 200. The first object 202 and the second object 204 are at different optical depths.

Figures 3A, 3B:
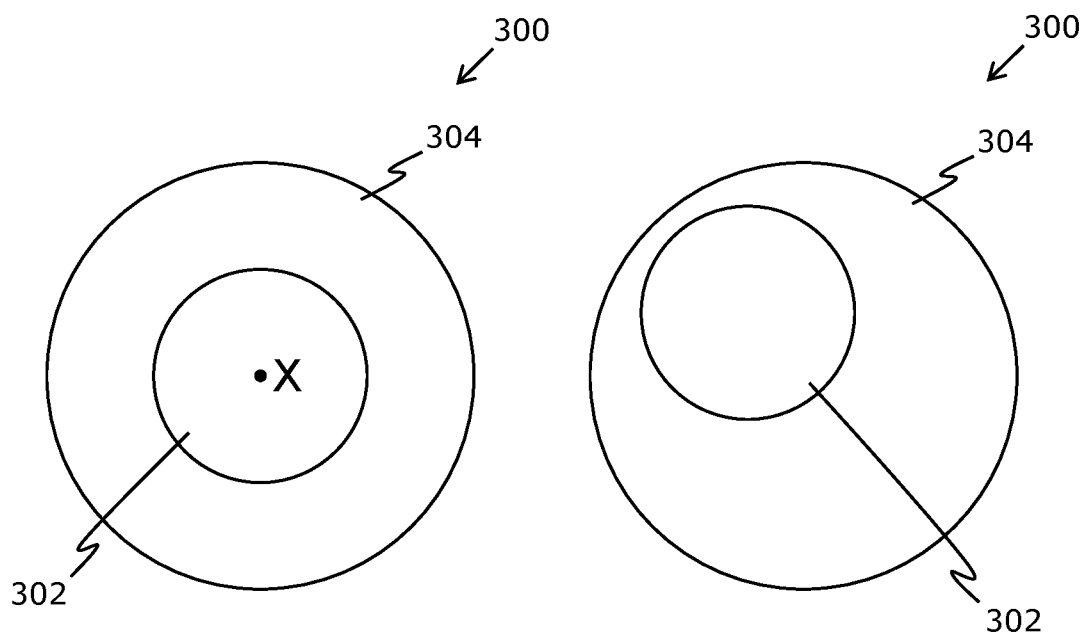
FIGS. 3A and 3B illustrate a given focusing lens of a given camera, in accordance with different embodiments of the present disclosure.

Referring to FIGS. 3A and 3B, illustrated is a given focusing lens 300 of a given camera (not shown), in accordance with different embodiments of the present disclosure. The given focusing lens 300 has a given portion 302 and a remaining portion 304. The given portion 302 is a portion of the given focusing lens 300 through which user's gaze passes. As an example, the given portion 302 has a circular shape, while the remaining portion 304 has a circular ring-like shape. In FIG. 3A, the given portion 302 and the remaining portion 304 are concentrically arranged about a common centre 'X'. In FIG. 3B, the given portion 302 and the remaining portion 304 are eccentrically (i.e., non-concentrically) arranged.

It may be understood by a person skilled in the art that the FIGS. 2A-2B and 3A-3B are merely examples, which should not unduly limit the scope of the claims herein. The person skilled in the art will recognize many variations, alternatives, and modifications of embodiments of the present disclosure.

Figure 4A:
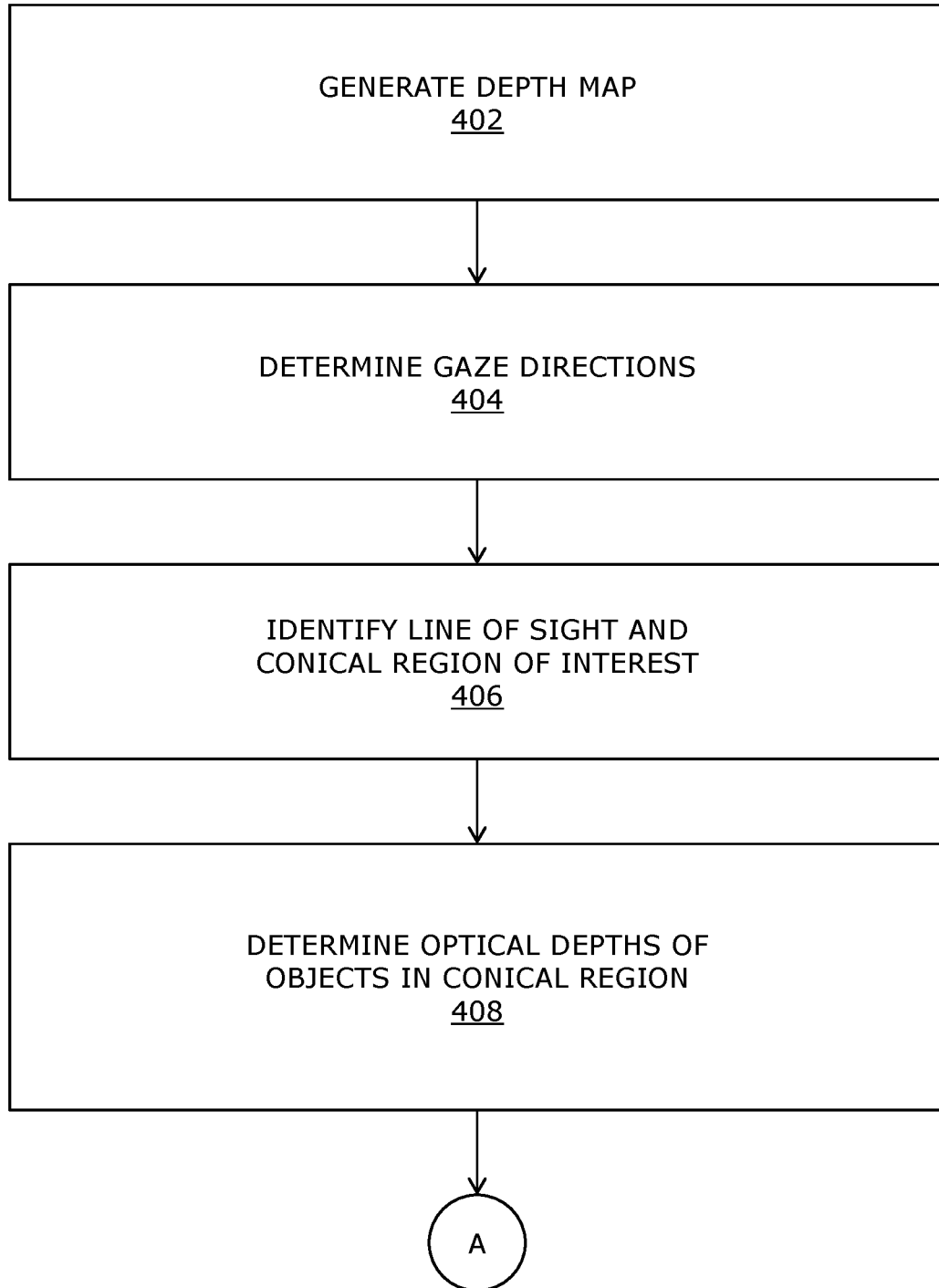
FIGS. 4A and 4B illustrate steps of a method for optical focus adjustment based on occlusion, in accordance with an embodiment of the present disclosure.
Figure 4B:
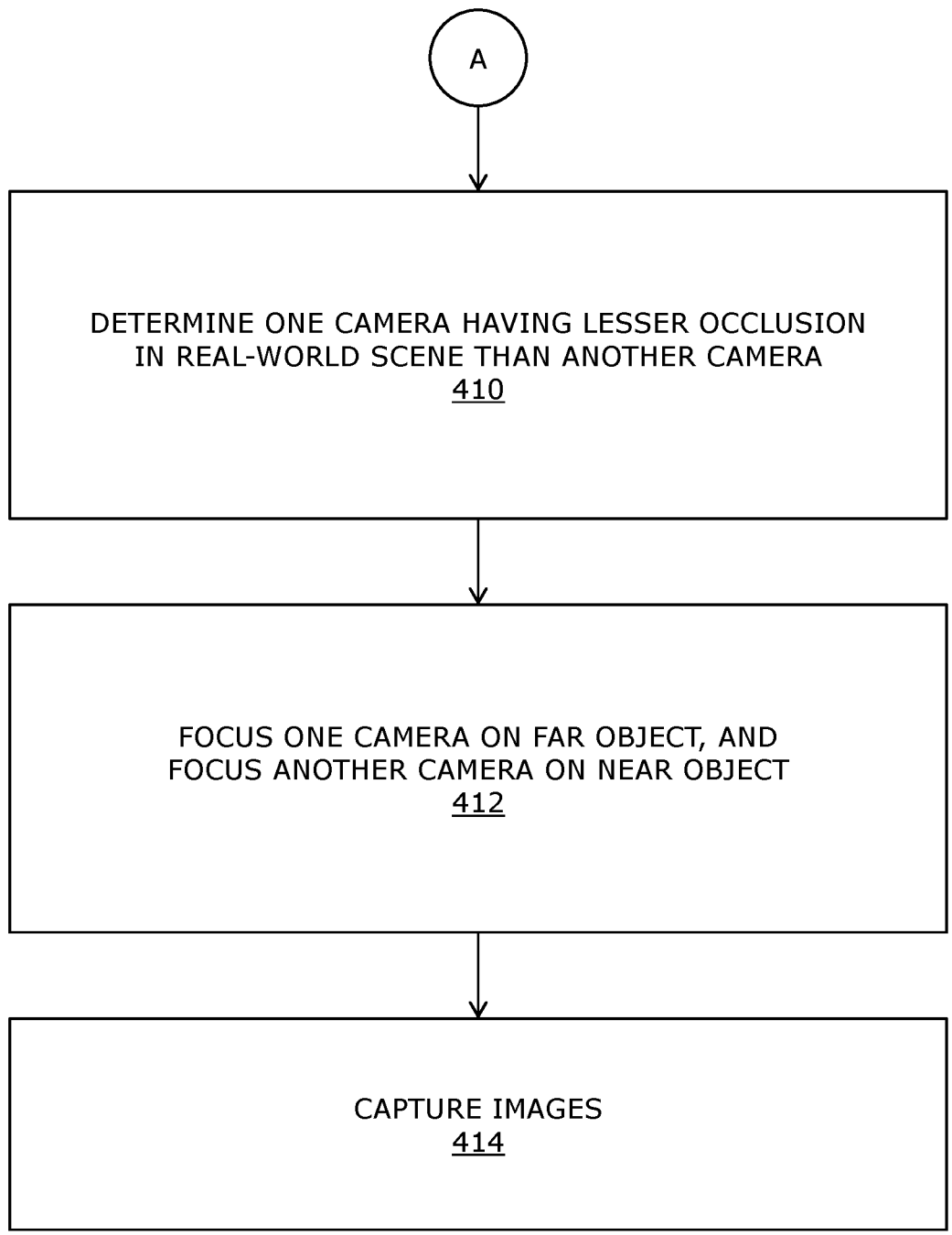

Referring to FIGS. 4A and 4B, illustrated are steps of a method for optical focus adjustment based on occlusion, in accordance with an embodiment of the present disclosure. At step 402, depth-mapping data collected by depth-mapping means is processed to generate a depth map of a given real-world scene of a real-world environment. At step 404, gaze-tracking data collected by gaze-tracking means is processed to determine gaze directions of a first eye and a second eye of a user. At step 406, a line of sight of the user and a conical region of interest in the given real-world scene whose axis is the line of sight of the user are identified, based on the gaze directions of the first eye and the second eye. At step 408, optical depths of a first object and a second object that are present at least partially in the conical region of interest in the given real-world scene are determined, based on the depth map of the given real-world scene, the first object and the second object being at different optical depths. At step 410, one of the first camera and the second camera that has lesser occlusion in the given real-world scene than another of the first camera and the second camera is determined. At step 412, an optical focus of the one of the first camera and the second camera is adjusted to focus on one of the first object and the second object whose optical depth is greater than the optical depth of another of the first object and the second object, and an optical focus of the another of the first camera and the second camera is adjusted to focus on the another of the first object and the second object, based on the optical depths of the first object and the second object. At step 414, the first camera and the second camera are controlled to capture at least one first image and at least one second image of the real-world environment using the adjusted optical focus of the first camera and the adjusted optical focus of the second camera, respectively, wherein the at least one first image and the at least one second image are captured from a perspective of the first eye and the second eye, respectively.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An imaging system comprising:
   a first camera and a second camera that are to be employed to capture images of a real-world environment from a perspective of a first eye and a second eye of a user, respectively, each of the first camera and the second camera having an adjustable optical focus;
   depth-mapping means;
   gaze-tracking means; and
   a processor configured to:
      process depth-mapping data, collected by the depth-mapping means, to generate a depth map of a given real-world scene of the real-world environment;
      process gaze-tracking data, collected by the gaze-tracking means, to determine gaze directions of the first eye and the second eye;
      identify, based on the gaze directions of the first eye and the second eye, a line of sight of the user and a conical region of interest in the given real-world scene whose axis is the line of sight of the user;
      determine, based on the depth map of the given real-world scene, optical depths of a first object and a second object that are present at least partially in the conical region of interest in the given real-world scene, the first object and the second object being at different optical depths;
      determine one of the first camera and the second camera that has lesser occlusion in the given real-world scene than another of the first camera and the second camera;
      adjust the optical focus of the one of the first camera and the second camera to focus on one of the first object and the second object whose optical depth is greater than the optical depth of another of the first object and the second object, and adjust the optical focus of the another of the first camera and the second camera to focus on the another of the first object and the second object, based on the optical depths of the first object and the second object; and
      control the first camera and the second camera to capture at least one first image and at least one second image using the adjusted optical focus of the first camera and the adjusted optical focus of the second camera, respectively.

2. The imaging system of claim 1, wherein the one of the first camera and the second camera that has lesser occlusion in the given real-world scene is determined, based on at least one of: the depth map of the given real-world scene, monocular clues from an image representing the given real-world scene, binocular disparities in a stereo image pair representing the given real-world scene, an optical flow in a sequence of images representing the given real-world scene.

3. The imaging system of claim 1, wherein, when determining the one of the first camera and the second camera that has lesser occlusion, the processor is configured to:
   determine an angular width of at least one object that is present in the conical region of interest in the given real-world scene at an optical depth that lies in a range of 10 centimetres to 150 centimetres; and
   divide the given real-world scene into a first side and a second side, wherein the first side and the second side of the given real-world scene face the first camera and the second camera, respectively,
wherein the one of the first camera and the second camera is determined to have lesser occlusion than the another of the first camera and the second camera, when more than 50 percent of the angular width of the at least one object is on a corresponding side of the another of the first camera and the second camera.

4. The imaging system of claim 1, wherein an apex angle of a cone formed by the conical region of interest lies in a range of 5 degrees to 25 degrees.

5. The imaging system of claim 1, wherein when determining the optical depths of the first object and the second object, the processor is configured to:
   determine optical depths of a plurality of objects that are present at least partially in the conical region of interest in the given real-world scene;
   determine relative poses of the plurality of objects with respect to the user, based on the optical depths of the plurality of objects;
   determine two regions within the given real-world scene on which the user's gaze has been fixated the most during at least a predefined time period;
   determine relative poses of the two regions with respect to the user; and
   select the optical depths of the first object and the second object from amongst the optical depths of the plurality of objects, when relative poses of the first object and the second object with respect to the user match with the relative poses of respective ones of the two regions.

6. The imaging system of claim 1, wherein when determining the optical depths of the first object and the second object, the processor is configured to:
  determine optical depths of a plurality of objects that are present at least partially in the conical region of interest in the given real-world scene; and
  select the optical depths of the first object and the second object from amongst the optical depths of the plurality of objects randomly.

7. The imaging system of claim 1, wherein the first camera and the second camera comprise a first focusing lens and a second focusing lens, respectively, and wherein the processor is configured to:
  determine a first portion of the first focusing lens and a second portion of the second focusing lens through which the user's gaze passes, based on the gaze directions of the first eye and the second eye; and
  when adjusting the optical focus of the first camera and the optical focus of the second camera, adjust a focal plane of the first focusing lens and a focal plane of the second focusing lens to compensate a field curvature of the first focusing lens and a field curvature of the second focusing lens, based on the first portion of the first focusing lens and the second portion of the second focusing lens, respectively.

8. The imaging system of claim 1, wherein the processor is configured to adjust the optical focus of the first camera and the optical focus of the second camera, further based on a depth of field of the first camera and a depth of field of the second camera at the optical depths of respective ones of the first object and the second object being focused.

9. A method comprising:
  processing depth-mapping data, collected by depth-mapping means, to generate a depth map of a given real-world scene of a real-world environment;
  processing gaze-tracking data, collected by gaze-tracking means, to determine gaze directions of a first eye and a second eye;
  identifying, based on the gaze directions of the first eye and the second eye, a line of sight of the user and a conical region of interest in the given real-world scene whose axis is the line of sight of the user;
  determining, based on the depth map of the given real-world scene, optical depths of a first object and a second object that are present at least partially in the conical region of interest in the given real-world scene, the first object and the second object being at different optical depths;
  determining one of a first camera and a second camera that has lesser occlusion in the given real-world scene than another of the first camera and the second camera;
  adjusting an optical focus of the one of the first camera and the second camera to focus on one of the first object and the second object whose optical depth is greater than the optical depth of another of the first object and the second object, and adjusting an optical focus of the another of the first camera and the second camera to focus on the another of the first object and the second object, based on the optical depths of the first object and the second object; and
  controlling the first camera and the second camera to capture at least one first image and at least one second image of the real-world environment using the adjusted optical focus of the first camera and the adjusted optical focus of the second camera, respectively, wherein the at least one first image and the at least one second image are captured from a perspective of the first eye and the second eye, respectively.

10. The method of claim 9, wherein the step of determining the one of the first camera and the second camera that has lesser occlusion is based on at least one of: the depth map of the given real-world scene, monocular clues from an image representing the given real-world scene, binocular disparities in a stereo image pair representing the given real-world scene, an optical flow in a sequence of images representing the given real-world scene.

11. The method of claim 9, wherein the step of determining the one of the first camera and the second camera that has lesser occlusion comprises:
  determining an angular width of at least one object that is present in the conical region of interest in the given real-world scene at an optical depth that lies in a range of 10 centimetres to 150 centimetres;
  dividing the given real-world scene into a first side and a second side, wherein the first side and the second side of the given real-world scene face the first camera and the second camera, respectively; and
  determining the one of the first camera and the second camera to have lesser occlusion than the another of the first camera and the second camera, when more than 50 percent of the angular width of the at least one object is on a corresponding side of the another of the first camera and the second camera.

12. The method of claim 9, wherein an apex angle of a cone formed by the conical region of interest lies in a range of 5 degrees to 25 degrees.

13. The method of claim 9, wherein the step of determining the optical depths of the first object and the second object comprises:
  determining optical depths of a plurality of objects that are present at least partially in the conical region of interest in the given real-world scene;
  determining relative poses of the plurality of objects with respect to the user, based on the optical depths of the plurality of objects;
  determining two regions within the given real-world scene on which the user's gaze has been fixated the most during at least a predefined time period;
  determining relative poses of the two regions with respect to the user; and
  selecting the optical depths of the first object and the second object from amongst the optical depths of the plurality of objects, when relative poses of the first object and the second object with respect to the user match with the relative poses of respective ones of the two regions.

14. The method of claim 9, wherein the step of determining the optical depths of the first object and the second object comprises:
  determining optical depths of a plurality of objects that are present at least partially in the conical region of interest in the given real-world scene; and
  selecting the optical depths of the first object and the second object from amongst the optical depths of the plurality of objects randomly.

15. The method of claim 9, wherein the first camera and the second camera comprise a first focusing lens and a second focusing lens, respectively, and wherein the method further comprises determining a first portion of the first focusing lens and a second portion of the second focusing lens through which the user's gaze passes, based on the gaze directions of the first eye and the second eye, wherein the step of adjusting the optical focus of the first camera and the optical focus of the second camera comprises adjusting a focal plane of the first focusing lens and a focal plane of the second focusing lens to compensate a field curvature of the first focusing lens and a field curvature of the second focusing lens, based on the first portion of the first focusing lens and the second portion of the second focusing lens, respectively.

16. The method of claim 9, further comprising adjusting the optical focus of the first camera and the optical focus of the second camera, further based on a depth of field of the first camera and a depth of field of the second camera at the optical depths of respective ones of the first object and the second object being focused.

* * * * *